June 9, 1931. D. M. WINANS 1,809,616
CONTROL SHUTTER FOR ENGINE RADIATORS
Filed July 15, 1929 3 Sheets-Sheet 1

INVENTOR
Daniel M. Winans.
BY
Louis Illmer.
HIS ATTORNEY

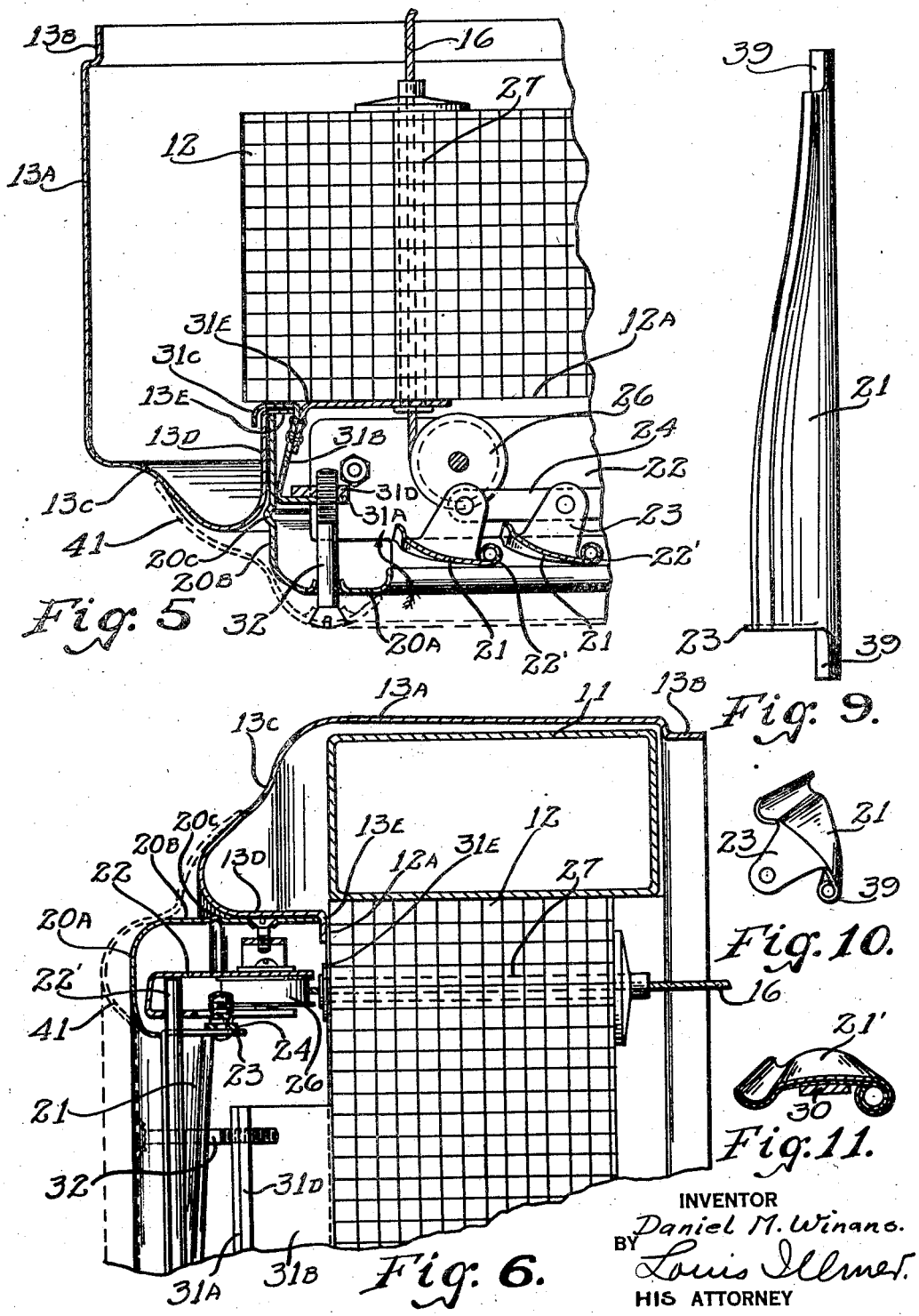

June 9, 1931.   D. M. WINANS   1,809,616
CONTROL SHUTTER FOR ENGINE RADIATORS
Filed July 15, 1929   3 Sheets-Sheet 3
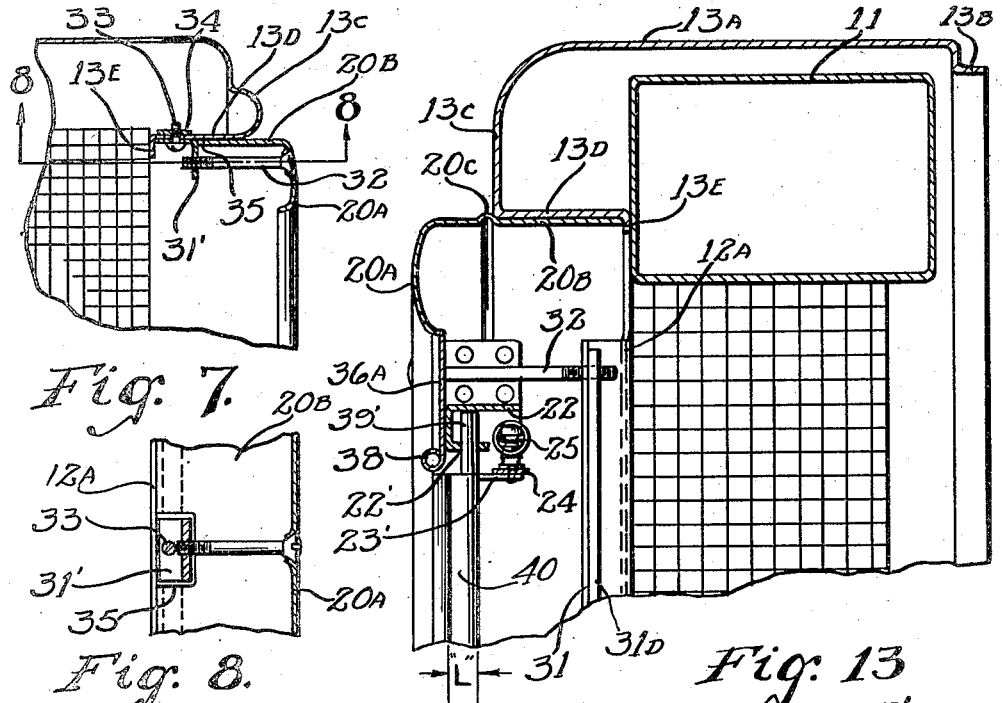
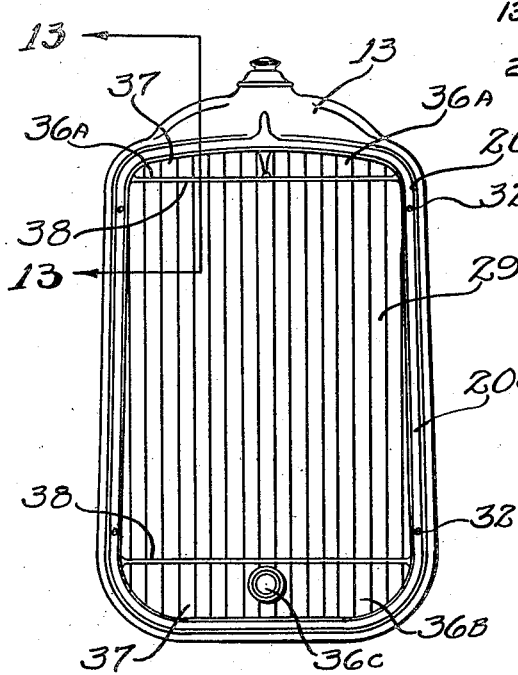
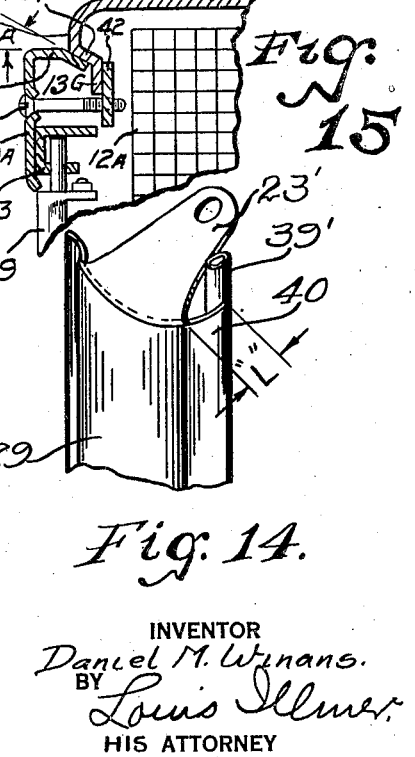
INVENTOR
Daniel M. Winans.
BY Louis Illmer
HIS ATTORNEY

Patented June 9, 1931

1,809,616

UNITED STATES PATENT OFFICE

DANIEL M. WINANS, OF BINGHAMTON, NEW YORK, ASSIGNOR TO THE BREWER-TITCHENER CORPORATION, OF CORTLAND, NEW YORK, A CORPORATION OF NEW YORK

CONTROL SHUTTER FOR ENGINE RADIATORS

Application filed July 15, 1929. Serial No. 378,197.

This invention relates to improvements in the art of manually operable shields or shutter fronts as applied to an air-cooled radiator for motor vehicles, especially such in which a supplemental shutter supporting frame is adapted for neat and convenient attachment to or removal from the radiator shell without requiring constructive changes in existing motor car radiator shells. More particularly, the present invention primarily strives to enhance the appearance of detachable shutter frame installations and aims to provide improved fastening means of the concealed type for securing my shutter frame directly to the regular radiator shell rather than to the cellular core encased therein, so as to in no wise mar the beauty of the radiator shell outline to which my device may be attached. As a distinctive feature, said shutter fastening devices include an interiorly disposed abutment or stop means associated with the core trimming shell, which stop cooperates with my frame securing members to constitute a rattle-proof shutter installation adapted to positively retain said frame in place against inward movement toward the radiator core without need of any exteriorly disposed clip means.

My improvements furthermore contemplate a novel and effective slat means of the vertical type adapted to selectively shut off air draft through the bottommost portion of the radiator core passages while still allowing of air-flow through the upper passages. To this end, my parallelly disposed shutter slats are given an initial torsional set or curled deformation; when it is desired to wholly close off the air-flow through my adjustable radiator shutter, said slats are sprung into flush alignment with respect to the transverse face of the shutter frame. Upon reopening, the respective upper slat ends are uncurled in advance of their lower slat ends; upon wider slat opening, a V shaped draft passage is progressively increased until the bottommost end portion of adjoining slats also begin to open, whereupon the entire group of interconnected slats further open in unison throughout their length. In closing, the slats operate in a reverse manner, namely by having the lowermost adjacent slat ends first come into overlapping abutment, and thereupon the respective twisted slats are progressively sprung into place until the respective upper slat ends are brought into a uniformly flat or fully closed relation.

The object of this invention is to provide for a simple, durable appurtenance of the character indicated and one that can readily be applied to existing makes of automobiles or trucks without requiring the frame attaching bolts to be entered through the radiator core passages in the conventional fashion or otherwise leaving the trimmed radiator face in a disfigured condition after removing my shutter frame therefrom.

In order to accomplish the cited new and useful results, said improvements further consist in novel panel and other structural features, and also in a compact, effective disposition of my shutter frame and attaching members, all of which will hereinafter be set forth in detail.

Reference is had to the accompanying three sheets of drawings which are illustrative of a specific embodiment of my invention, in which like characters of reference indicate like parts, and in which drawings:—

Fig. 2 represents an elevational front view of my shutter assembly frame mounted in place with the radiator shell shown in dotted outline and the upper portion of my plural vertical slats standing in cracked or partially opened position, while

Fig. 5 is a similar view as taken along the vertical line 5—5 of Fig. 2.

Fig. 6 illustrates in vertical section, the assembled relation of certain shutter frame fastenings as seen along line 6—6 of Fig. 2 except that a trim rim has been fitted thereto.

Fig. 7 represents an equivalent modified means for removably attaching my shutter frame to its radiator shell and Fig. 8 is a sectional detail taken along line 8—8 of Fig. 7.

Figs. 9 and 10 respectively show an edge and an end view of my single leaf twisted slat as used in connection with said shutter assembly.

Fig. 11 represents in transverse section, a modified style of twisted slat in which the leaf is laminated.

Fig. 12 is a modified frame structure in which straight vertical slats are disposed to align with inset panels.

Fig. 13 shows a sectional view as taken along line 13—13 of Fig. 12, while Fig. 14 is a fragmentary perspective detail of a straight slat having an offset trunnion associated therewith.

Fig. 15 shows still another shutter frame modification adapted to cooperate with a different style of shell formation.

Figure 1:
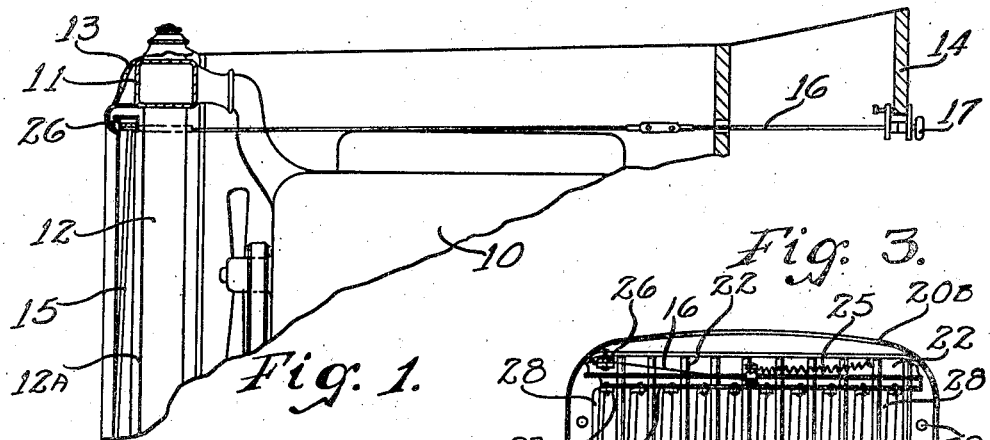
Fig. 1 is a vertical elevation taken in partial section to show the general arrangement of my improved shutter frame as applied to the front face of an automobile radiator shell with a hand-operated actuating control carried up to the vehicle instrument board.
Figure 3:
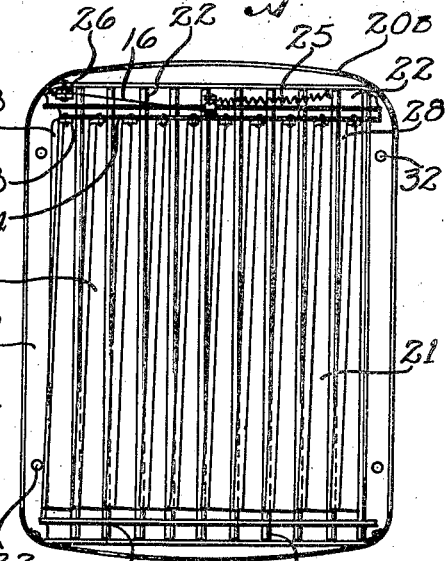
Fig. 3 represents an enlarged fragmental rear view of the removed frame.
Figure 2:
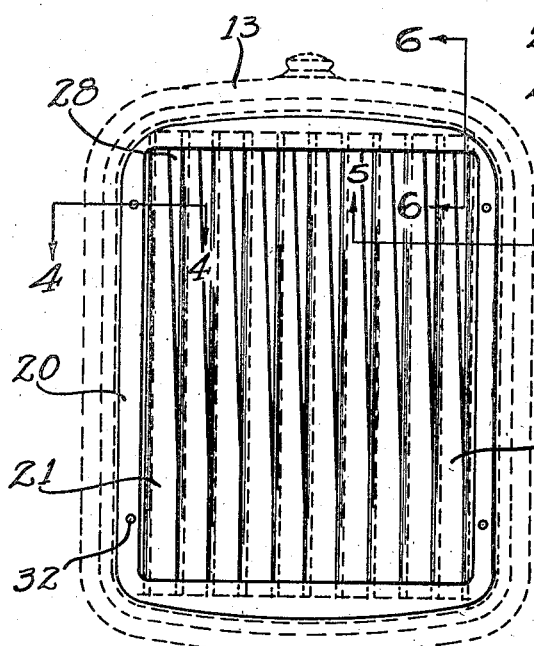

Referring first to Fig. 1, this is intended to outline certain conventional motor radiator elements indirectly associated with my devices, comprising the following parts: the vehicle motor 10; an upper radiator tank 11, a honeycomb or similar type of cellular radiator core 12; a regular radiator shell 13 adapted to surroundingly trim the core and tank; and an instrument board 14 or the like.

The radiator shield or shutter assembly designated in its entirety as 15, is mounted in front of the radiator; extending rearward therefrom, is a slat actuating cable 16 adapted for convenient manipulation by the car driver, this being preferably accomplished through the medium of a panel control 17 of the screw type such as is more fully disclosed in my prior Patent 1,660,146 dated Feb. 21, 1928.

As will be understood, the shell 13 is provided with the conventional fenestrated central opening through which air-flow is admitted to cool the radiator core; this circumscribing shell as taken in profile, generally comprises an exterior casing or shell wall 13A of which the rearward ledge may be offset at 13B to receive the motor hood, while the inturned transverse shell face 13C is usually bulged out and made to extend forwardly in spaced relation to the flat front face 12A of said core. The inner marginal edge of the inturned forward shell face 13C may be shaped to extend longitudinally rearward to constitute an interior wall such as 13D, which in turn may terminate in a foot flange 13E adapted to abuttingly rest upon the transverse core face 12A as shown in Figs. 5 and 6.

Figure 4:
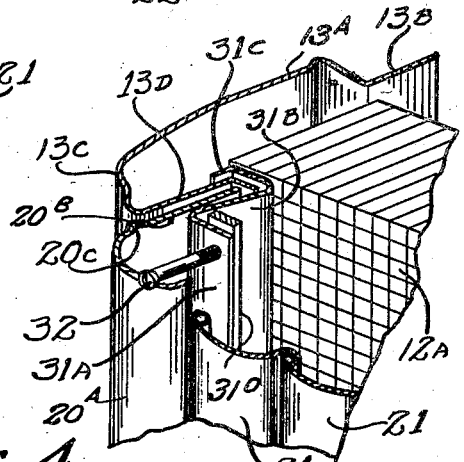
Fig. 4 shows a perspective view as taken along the horizontal line 4—4 of Fig. 2.

Taking up now a detailed description of the shutter frame 20 which is intended to controllably close the rectangular shell fenestration. Said hollow frame is preferably stamped or drawn up in one piece from sheet-metal and given an angle-shaped profile comprising an inturned annular front flange 20A and a circumscribing adjoined flange 20B. The last named tube-like wall member defines the outermost contour of my shutter frame and the perimeter thereof is kept considerably larger in size than is the central opening through the radiator shell in order that an overlapping joint may be made with respect to the marginal edge region of said opening. The complementary flange 20B may be disposed in a rectangular relation to the forward core face 12A and made to telescope for a substantial distance within the interior shell wall 13D so that the innermost free flange edge may be superimposed upon the exterior face of the foot flange 13E in the manner disclosed in Figs. 4 and 5. A trim ridge 20C may be rolled or spun to extend outwardly from the frame wall 20A when it is desired to substantially conceal any gap that may be formed between said telescoped members.

In the present instance, the plural shutter slats such as 21 are vertically carried between a pair of U or trough shaped slat racks such as 22, respectively mounted within the top and bottom horizontal frame members. The respective innermost or shorter legs of said racks are apertured in aligned spaced relation to receive the trunnioned ends 39 of my parallelly disposed slats and which trunnion ends are made to abut against the outermost or longer legs of said complementary racks. Each such slat may further be provided with a transversely disposed actuating arm 23 adapted to be pivotally interconnected by the tie-rod 24 that is shown mounted behind said top frame member. In addition, said rod is equipt with a spring 25 preferably tending to throw the slats inwardly toward the core face into open position. As will be understood, one end of the cable 16 is attached to said tie-rod and run over the guide pulley 26, thence carried rearwardly through the tubular core protector 27 for manipulation from the control 17. By the means described, the slats may in unison be given a swinging movement about their respective trunnions.

While closing my twisted slats, they at first move freely up to the point where the bottom or foremost slat edge engages its mate, but thereafter, the slats are sprung home. The cited cable actuating device of the screw type is especially suitable for this purpose because it enables the operator easily to draw shut shutters of the type indicated as contrasted with the considerable effort that might have to be exerted in case a direct hand pull control were used.

In this connection it is emphasized that my slats 21 are preferably fabricated from relatively thin resilient material having a relatively low shear modulus, such as spring brass or the like, and that each individual slat is torsionally curled or twisted around its longitudinal trunnion axis to impart an initial set thereto as indicated by Figs. 9 and 10. The slat mounting is preferably such that upon release of the cable 16, the uppermost free slat edge is first made to swing inwardly toward the core and away from the overlapping trunnion edge of its adjacent slat, thus initially forming an adjustable V-shaped draft opening 28 between each of such slat edges. While opening the slats, this V gap gradually widens out at the top and is progressively carried downwardly, until finally, the entire length of each such swinging slat edge is effectively opened to the passage of air-flow. Thereupon, any further release on part of the cable continues to increase the controlled shutter passage until the slats stand in a substantially rectangular or fully opened relation to the front face of the core. In closing, the lowermost swinging edge of each such slat is first moved into overlapping abutment with respect to the trunnion edge of its adjacent slat; continued pull on part of said cable, thereupon causes the various slats to uncurl until the original twist deformation has been entirely taken up; the plural slats are thereby brought into alignment and both ends thereof made to lie flush with the respective top and bottom frame cross members.

In further explanation of the described shutter frame shape, its flange 20B is preferably given a sufficient depth as measured away from the core face 12A, to carry its complementary front flange 20A well forward of the extreme limit of the inturned shell wall 13C, such that the respective slat trunnions may be mounted to lie wholly ahead of the last named wall and between said inwardly projecting flange 20A.

By virtue of these simple devices, I am enabled to provide for a shutter capable of initially opening only the uppermost core area to air flow while direct passage through the lowermost core area is kept restricted, all without resort to the more complicated group or sectional mounting of slats such as are conventionally opened in successive order. As will be understood, the cited expedient is primarily intended during extremely cold weather, to obviate freezing of the engine jacket water lying toward the bottom of the radiator. While Figs. 9 and 10 are intended to show a slat leaf as made stamped from a single sheet of metal, Fig. 11 represents a transverse section of a similar slat 21' that is built-up into laminated structure; the thin sheet stock thereof affords a greater degree of twist flexure without abnormal stressing of the metal in the event a material possessing a relatively high shear modulus, should be used in making up such twistable slats. Augmented lateral rigidity may be given to such relatively thin slat leaves, by the use of a narrow reenforcement strap 30 which is preferably disposed lengthwise of the slat in close adjacency to the trunnion axis as shown.

Referring now to the improved fastening devices by which my frame may be attached to the radiator shell without having to employ long screw shanks that run through the cellular core 12 and are bolted to the rear thereof in the conventional fashion. Instead, I preferably resort to a cross-sectionally Z shaped hook clip 31 disclosed in Figs. 4 and 5. This strip is shown as disposed along each of the frame side members, and comprises a transversely disposed bolt leg 31A that may be inturned from the foremost edge of the web 31B, while the complementary rearmost web edge may be outturned into the hook leg 31C; the latter is intended to be hooked around the shell foot flange 13E and to be interposed between it and the front core face 12A, as shown. If desired, the relatively narrow leg 31A may be provided with a tapped underlaid reenforcing strip 31D adapted to receive the frame fastening screws such as 32.

It will be observed that the outer marginal edge of said bolt leg is made to abut the inner face of the frame flange 20B and that any pull exerted on part of the screw 32 tends to spring said leg into outwardly braced relation against said frame face. The use of four screws usually suffices to demountably hold the shutter frame 20 in place, and the respective screw shanks are preferably entered through the side members of the front flange 20A; as shown, thus concealing the whole of my clip devices and leaving exposed merely the various screw heads. The spaced disposition given to said bolt leg with respect to the core, is such that cooling air may still flow toward the face 12A without appreciable contraction; as will be obvious, the shutter frame may be removed at will, without despoiling the trim appearance of the radiator front or the car lines.

Not only are the usual large washers and inaccessible bolt nuts eliminated at the rear core face, but the absence of through bolts further prevents wearing through of the surrounding thin core-cell walls. Furthermore, my fastening clips may be located in definite spaced relation adapted to register accurately with any given frame screw layout. As a further refinement, the upper end portion of one such strip-like clip may be made to carry the angular locating lug 31E such as is indicated in Fig. 5. One lug end is shown riveted to said clip while the other lug end is apertured and made to extend upwardly along the front core face 12A so as to register with and locate the cell opening through which it is desired to insert the core protector 27, it being understood that as applied to new equipment purposes, the associated radiator core parts are usually held to given dimensions and that the lug aperture will be properly held in place to receive said protector therethrough.

Instead of utilizing a single continuous strip for each of the frame sides as described, each of the screws 32 may be individually equipt with short clips without being interconnected; such separate clips may be more positively secured to the radiator shell by any suitable means, such for instance as is shown in Figs. 7 and 8. Here the angle-shaped clip 31' requires no hook leg 31C but instead the shell screw 33 is directly bolted by said clip to the interior wall 13D, there being preferably provided for this purpose an attached backing strip 34 disposed within said forward shell bulge as disclosed. The upstanding frame flange 20B is then notched back as at 35, to provide for clearance space around such readily removable clip 31'.

As a substitute for the described trim ridge 20C adapted to efface the described telescopic joint as formed between the annular frame flange 20B and its circumscribing interior shell wall 13D, it may in certain cases, be desirable to wholly conceal said joint in straddling relation by the use of an endless bezel-like cover 41 as shown by dotted outline in Fig. 5. This trim plate simulates a one-piece radiator shell and is preferably given a dished profile conforming to the rounded members covered thereby; the outermost plate edge is preferably inset and snugly nested into a registering annular indentation or crevis 13C' as formed in the inturned casing front 13C, while the opposite plate edge portion is neatly adjoined to and centered by the protruding front frame flange 20A. As indicated in the drawings, said cover plate may be held in place by the same screw fastenings that secure the shutter frame to the shell.

As a further design refinement, the appearance of my device may be simply and effectively enhanced by vertically lengthening-out the frame over that previously described, and encasing the respective top and bottom tanks behind dummy panel effects in the fashion indicated in Figs. 12 and 13. Such top and bottom dummy panels may either be inset or formed integral with the frame and are respectively designated as 36A and 36B, the latter being provided with a removable cap 36C for engine cranking purposes. Each such panel may be mounted in the fashion indicated in Fig. 12 and preferably provided with vertically disposed plate having rounded flute or bow-shaped grooves such as 37, of which the crown is faced outwardly and the groove spacing made to coincide with the slat widths. The respective innermost free edges of said panels are transversely beaded at 38 and turned outwardly to mount the shutters therebetween. When such dummy panels are used, it is preferred to use slats of the straight type so mounted that in closed position, their rounded exterior faces will fall in substantial vertical alignment and register with their respective panel flute profiles in the manner represented in Fig. 13. To this end, straight slats such as 29 are here resorted to and the slat trunnions 39' are laterally offset at 40 with respect to slat body portion to an extent marked "L" in Fig. 14; this in turn, allows the slat-rack fulcrum bearings 22' of Fig. 13 to be set back rearwardly of its adjacent panel bead as shown. In this modified slat, the actuating arm 23' may still be formed integral with the slat body and bent up at right angles, as shown. In further explanation of the modified slat mounting required in such association, each trough-shaped rack 22 has its web-like member disposed in close adjacency to the respective panels while the rack ends may be turned up and suitably fastened in abutting relation across the complementary frame flanges 20B.

A still further modification of my frame is indicated in Fig. 15. Here is represented a style of sheet-metal frame especially suited for new equipment work, that is not only compact but allows a common formation of the core shell 13' to be utilized without marring the finished appearance of the radiator shell installation. In this disclosure, the front shell face 13C is kept substantially flat as in Fig. 13 except the previously described interior shell wall 13D is now given an oblique disposition and the core face 12A is kept rearwardly spaced from the alternatively arranged foot flange 13G the last named flange being integrally supported by the outwardly flared or dished centering portion 13F that is preferably given an acute angular taper designated as "A".

The style of stamped frame that is especially designed to cooperate with a shell flare of this character, comprises a front flange 20A substantially as described, whereas the complementary flange 20B' associated therewith, is modified to coact with said shell flare 13F. To this end, the rearward free edge or brim region of the frame flange 20B' is crimped inwardly and given an angular offset adapted to be received by said shell flare and form a slightly offset continuation of the front shell face. It will be observed that the frame front 20A merely stands ahead of the shell face 13C to a comparatively small extent, notwithstanding that the entire frame structure is wholly disposed forward of the radiator shell.

The frame screws 32 serve to clamp said beveled edges together. In the present instance, overhanding clip lugs such as 42 may be resorted to and these may be formed integral with the foot flange 13G or be otherwise secured thereto. Owing to the lack of rigidity on part of a relatively light frame work such as is shown in Fig. 15, it is furthermore expedient to directly attach therebehind, an endless frame work 43 which in cross-section may assume a profile similar to that given the rack 22.

It is to be understood that the various phases of my improved shutter appurtenances need not all be incorporated in one and the same shutter frame, and that various changes in the details and mode of manipulation thereof may be resorted to in likewise carrying out the aforesaid illustrative structural embodiment, all without departing from the spirit and scope of my invention hereinbefore described and more particularly pointed out in the appended claims.

Claims—

1. In a radiator shutter serving to control air-flow, a fenestrated frame work, slats of the twistable type pivotally mounted therein, and means for twisting the respective slats against said frame work and thereby substantially closing the frame fenestration to air-flow.

2. In a shutter device serving to control air-flow therethrough, a fenestrated frame work provided with a group of resilient slats pivotally mounted therein, each such slat being given a curled shape which when distorted is adapted to cooperatively close the frame fenestration and to progressively reopen from one slat end portion thereof.

3. In a shutter device serving to control air-flow, a fenestrated framework provided with top and bottom rack means, a series of vertically disposed twisted slats mounted between said racks, said slats being adapted to be sprung into flush alignment for the purpose of closing the frame fenestration and to open the upper end portions of the respective slats in advance of their lower end portions, and means for actuating said slats in unison.

4. In a shutter device serving to control air-flow, a fenestrated framework provided with complementary rack means, a plurality of resilient slats of the spirally deformed type pivotally mounted between said racks, said slats being disposed in parallel overlapping relation and allowed to swing freely from open into partially closed position, whereupon a swingable leading slat edge engages its adjacent slat and the respective slats are sprung into a flush relation, and actuating means of the screw type serving to draw said slats into said flush relation.

5. In a radiator shutter serving to control air-flow, a fenestrated framework provided with complementary rack means, laminated slats mounted between the rack, said slats being adapted to be torsionally deformed, and means for axially twisting and untwisting said slats.

6. In a radiator shutter serving to control air-flow, a fenestrated framework provided with complementary rack means, a slat of the laminated type having its respective trunnion ends pivotally mounted between the racks, reenforcing strip means disposed lengthwise of said slat in proximity to the trunnion axis, and means for axially twisting and untwisting said reenforced slat.

7. In a radiator shutter serving to control air-flow therethrough, a cellular core provided with a front face of the honeycomb type, a shell having an opening admitting air to said face, a fenestrated frame mounting adjustable slats therein and which frame is adapted to substantially close said shell opening, fastening means for holding said frame in place, tie means for actuating said slats in unison, an apertured locating lug carried my said frame with the aperture thereof disposed in substantial registery with one of the core cells, a core protector adapted to be entered through the lugs aperture and said one core cell, and cable means running through said protector and serving to manipulate the tie-means.

8. In a radiator shutter serving to control air-flow, a cellular core provided with a front face, a shell comprising a transverse wall together with an annular inturned interior wall terminating in a foot flange, a fenestrated shutter framework of angular cross-sectional profile including a dependent front flange and a complementary circumscribing flange of which latter the free marginal edge is adapted to telescope within said interior shell wall and rest in superimposed relation upon the foot flange, and means for detachably securing said frame in place.

9. In a radiator shutter serving to control air-flow, a cellular core provided with a front face, a core shell comprising a forwardly spaced transverse wall together with an annular interior wall that is rearwardly inturned toward and terminates in an abutting relation to said core face, a fenestrated shutter framework of angular cross-sectional profile including an apertured pendant flange and a complementary circumscribing flange of which latter the free marginal edge is adapted to telescope within the aforesaid interior wall of the radiator shell, clip means of the hook type disposed wholly behind said pendant frame flange and adapted to be interposed between said interior shell wall and its abutting core and which clip is further provided with bolt leg means, and screw means entered through the aperture of said pendant frame flange and adapted to operatively engage said leg means, said clip and screw constituting the sole means of frame securement to the shell.

10. In a radiator shutter adapted to control air-flow, a cellular core including a front face, a shell serving to embrace the core, said shell being bulged forwardly in spaced relation to said face and provided with a central opening admitting air thereto, a fenestrated frame serving to mount adjustable slats therein and which frame is adapted to substantially close said shell opening, and an annular cover plate adapted to cooperate with said groove and conceal the outermost marginal portion of said frame.

11. In a radiator shutter adapted to control air-flow therethrough, a cellular core provided with a front face, a shell having an opening admitting air to said face and which opening is circumscribed by an interior shell wall, a fenestrated framework of angular cross-sectional profile comprising an inturned front flange and a complementary flange disposed in upstanding relation thereto of which latter flange its free marginal edge is adapted to make a telescopic joint with respect to said interior shell, and trim means associated with said frame serving to wholly mask said telescopic joint.

12. In a radiator shutter serving to control air-flow, a cellular core provided with a front face, a fenestrated sheet-metal frame adapted to adjustably admit air to said face, said frame including a front flange whose plane is kept forwardly spaced with respect to said core face, complementary apertured racks mounted upon flange side facing said core and which apertures are respectively placed in an offset rearward relation to the last named flange side, a group of slats pivotally mounted between said racks and serving to adjustably close the frame fenestration, each such slat being provided with a pair of laterally offset trunnions and which group of slats in closed position is adapted to fall into substantial alignment with said flange plane, and means for actuating said slats in unison.

13. In a radiator shutter serving to control air-flow, a cellular core provided with a front face, a sheet-metal frame adapted to adjustably admit air to said face, said frame including a front flange whose plane is kept forwardly spaced with respect to said core face, said frame being provided with oppositely disposed panels placed to substantially align with the plane of said flange and constitute a rectangular fenestration therebetween, complementary apertured racks respectively mounted adjacent to the panel side facing said core and which apertures are placed in an offset rearward relation to the last named panel side, and a group of slats pivotally mounted between said racks and serving to adjustably close the frame fenestration, each such slat being provided with a pair of laterally offset trunnions and which group of slats in closed position is adapted to fall into substantial alignment with the panel plane.

14. In a radiator shutter, a fenestrated sheet-metal frame of angular cross-sectional profile comprising an inturned front flange and an integral circumscribing flange, complementary trough-shape racks respectively mounted lengthwise of the interior side of said inturned flange along opposite free marginal edges thereof and of which racks each such have their respective innermost leg members apertured and disposed in a substantially upstanding relation to said flange side, and a group of slats serving to adjustably close the frame fenestration, each such slat having the ends thereof provided with oppositely disposed trunnions respectively adapted to extend through certain of the aforesaid complementary leg apertures and to rotatably abut the outermost companion leg members of the respective racks.

15. In a shutter for vehicle purposes adapted to control air-flow therethrough, the combination of a shell comprising a front face providing for a fenestration having an outwardly flared angular portion disposed adjacent to the fenestration margin, a removable shutter frame including an annular inturned flange and an integrally formed circumscribing flange of which latter its free edge is crimped inwardly and adapted to be cooperatively received by said angular shell portion to form a centered joint therewith, complementary shutter rack means carried by said inturned frame flange, and slats pivotally mounted between said racks.

16. In a shutter for vehicle purposes adapted to control air-flow therethrough, the combination of a shell comprising a front face providing for a fenestration having an outwardly flared angular portion disposed adjacent to the fenestration margin, a removable shutter frame including an annular inturned brim-like flange together with a circumscribing flange, the latter having a free edge portion crimped inwardly and adapted to form a joint with said brim-like flange, and frame fastening means serving to draw said joint together.

17. In a radiator shutter serving to control air-flow therethrough, a cellular core provided with a front face, a shell having an opening for admitting the air to the face of the core, a fenestrated frame having a wall disposed in a spaced forward relation to the core face, adjustable slats mounted in said frame, means for connecting the frame to the shell including attaching means located wholly within the shell and behind said frame wall, and fastening means inter-connecting the frame and the aforesaid attaching means.

18. In a radiator shutter serving to control air-flow therethrough, a cellular core provided with a front face, a shell having an opening admitting air to said face and provided with a part which is inturned rearwardly toward the core, a fenestrated frame mounting adjustable slats therein, said frame being adapted to telescope within the inturned part of said shell and to overlappingly close said shell opening, and fastening means detachably securing the frame to the shell.

19. In a radiator shutter serving to control air-flow therethrough, a cellular core provided with a front face, a shell having an opening admitting air to said face and provided with a part which is inturned rearwardly toward the core, a fenestrated slat frame provided with a wall disposed in spaced relation to the core face and which frame fits within the inturned part of said shell and serves to substantially close said shell opening, and fastening means including parts located wholly within the shell and back of said frame wall and positioned to retain the frame and slats against movement toward the core.

20. In a radiator shutter adapted to control air-flow, a cellular core including a front face, a shell serving to embrace the core, said shell being bulged forwardly in spaced relation to said face and provided with a central opening admitting air therethrough and a fenestrated frame serving to mount adjustable slats therein and which frame is adapted to substantially close said shell opening, the joint between the aforesaid shell and frame being masked by a bead on one of said elements.

In testimony whereof, I have herewith set my hand this 12th day of July, 1929.

DANIEL M. WINANS.